(12) United States Patent
Stenneth (10) Patent No.: US 11,704,344 B2
(45) Date of Patent: Jul. 18, 2023

(54) METHOD AND APPARATUS FOR DETERMINING WEATHER-RELATED INFORMATION ON A TILE BASIS

(71) Applicant: HERE Global B.V., Eindhoven (NL)

(72) Inventor: Leon Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 191 days.

(21) Appl. No.: 15/333,637

(22) Filed: Oct. 25, 2016

(65) Prior Publication Data
US 2018/0113882 A1    Apr. 26, 2018

(51) Int. Cl.
*G06F 16/29*    (2019.01)

(52) U.S. Cl.
CPC .............. *G06F 16/29* (2019.01); *Y02A 90/10* (2018.01)

(58) Field of Classification Search
CPC .. G01C 21/32; G01C 21/3626; G01C 21/367; G01C 21/3492; G01C 21/34; G01C 21/3446; G01C 21/3691; G01C 21/3638; G01C 21/3667; G08G 1/096816; G08G 1/09685; G08G 1/20; G08G 1/0104; G08G 1/096844; G06F 3/0481; G06F 3/167
See application file for complete search history.

(56) References Cited

U.S. PATENT DOCUMENTS

| | | | |
|---|---|---|---|
| 5,517,193 A | 5/1996 | Allison et al. | |
| 6,240,369 B1 * | 5/2001 | Foust | G01W 1/00 342/26 R |
| 6,252,605 B1 * | 6/2001 | Beesley | G06F 16/9027 345/441 |
| 6,389,289 B1 * | 5/2002 | Voce | H04B 7/18547 455/429 |
| 6,441,773 B1 | 8/2002 | Kelly et al. | |
| 6,542,825 B2 | 4/2003 | Jones et al. | |
| 6,829,536 B2 | 12/2004 | Moore | |
| 7,949,330 B2 | 5/2011 | Yuhara et al. | |
| 8,054,214 B2 | 11/2011 | Bunch | |
| 8,521,426 B2 | 8/2013 | Kelly et al. | |

(Continued)

FOREIGN PATENT DOCUMENTS

CN    103336772 A  *  10/2013  ............. G06F 17/30

OTHER PUBLICATIONS

Spatial multi-database topological continuity and indexing: a step towards seamless GIS data interoperability, Robert Laurini, International Journal of Geographical Information Sciences. vol. 12, Jun. 4, 1998, pp. 373-402 (Year: 1998).*

(Continued)

*Primary Examiner* — Augustine K. Obisesan
(74) *Attorney, Agent, or Firm* — Alston & Bird LLP (57) ABSTRACT

A method, apparatus and computer program product determine weather-related information for a respective tile associated with a geographical region. In the context of a method, at least one of weather data or radar data is received and caused to be stored in a data structure. For a respective tile, the method retrieves the at least one of the weather data or radar data from the data structure. The respective tile is one of a plurality of tiles. Each tile is associated with a respective geographical region. The method also determines weather-related information for the respective tile based upon the at least one of the weather data or radar data that was retrieved from the data structure.

21 Claims, 6 Drawing Sheets

(56) References Cited

U.S. PATENT DOCUMENTS

| | | | | |
|---|---|---|---|---|
| 8,782,041 B1* | 7/2014 | Daniel | ............... | G06F 16/951 707/724 |
| 8,872,846 B2 | 10/2014 | Kew et al. | | |
| 8,977,491 B1* | 3/2015 | McCusker | ............... | G01S 13/95 342/26 B |
| 9,223,020 B1* | 12/2015 | Crosmer | ............... | G01S 13/951 |
| 9,535,158 B1* | 1/2017 | Breiholz | ............... | G01S 13/953 |
| 9,940,743 B1* | 4/2018 | Umare | ............... | G06T 11/40 |
| 2007/0049260 A1* | 3/2007 | Yuhara | ............... | G01C 21/3694 455/414.3 |
| 2008/0071465 A1* | 3/2008 | Chapman | ............... | G01C 21/3691 701/117 |
| 2009/0160873 A1* | 6/2009 | Kew | ............... | G06Q 10/00 345/629 |
| 2009/0259686 A1* | 10/2009 | Figueroa | ............... | G06F 16/29 |
| 2011/0055290 A1* | 3/2011 | Li | ............... | G06F 16/29 707/807 |
| 2011/0257949 A1* | 10/2011 | Vasudevan | ............... | G06F 17/18 703/2 |
| 2011/0292030 A1* | 12/2011 | Jiang | ............... | G01C 21/3694 345/418 |
| 2013/0095892 A1* | 4/2013 | Bliss | ............... | G06F 16/29 455/566 |
| 2013/0322702 A1* | 12/2013 | Piemonte | ............... | G01C 21/26 382/113 |
| 2013/0332057 A1* | 12/2013 | Moore | ............... | G08G 1/0962 701/118 |
| 2014/0362088 A1* | 12/2014 | Veillette | ............... | G01S 7/062 345/441 |
| 2015/0067032 A1 | 3/2015 | Djabarov et al. | | |
| 2015/0088853 A1* | 3/2015 | McDonald | ............... | G06F 16/444 707/711 |
| 2015/0161150 A1* | 6/2015 | Goering | ............... | G06F 16/29 707/743 |
| 2015/0256277 A1* | 9/2015 | Johnson | ............... | G01W 1/02 340/601 |
| 2015/0304813 A1* | 10/2015 | Esposito | ............... | G01S 13/951 455/456.2 |
| 2015/0341749 A1* | 11/2015 | Jodlauk | ............... | H04L 12/1845 455/414.2 |
| 2015/0370828 A1* | 12/2015 | Maurer | ............... | G06F 16/2228 707/722 |
| 2016/0266249 A1* | 9/2016 | Kauffman | ............... | G01S 7/003 |
| 2016/0300375 A1* | 10/2016 | Beckett | ............... | G06T 3/4092 |
| 2017/0090682 A1* | 3/2017 | Cooper | ............... | G01C 21/3667 |
| 2017/0371074 A1* | 12/2017 | Elkabetz | ............... | G01W 1/10 |

OTHER PUBLICATIONS

Legates, D. et al., *Integratrating Weather Information Into an Integrated Transportation Management System*, [retrieved Dec. 9, 2016]. Retrieved from the Internet: < https://ams.confex.com/ams/pdfpapers/31572.pdf >. 4 pages.

Lin, Charles, *Integration of real-time weather data and Geographic Information System (GIS) for use in transportation*, Concours RCM$_2$ (2001/2002). Retrieved from the Internet: <URL: http://www.crm.umontreal.ca/rem2/Chercheurs01_02/Lin.PDF >. 2 pages.

* cited by examiner

METHOD AND APPARATUS FOR DETERMINING WEATHER-RELATED INFORMATION ON A TILE BASIS

TECHNICAL FIELD

An example embodiment of the present disclosure relates generally to the determination of weather-related information and, more particularly, to the determination of weather-related information for a respective tile associated with a geographical region.

BACKGROUND

Real time weather estimation is utilized in conjunction with various applications. Real time weather estimation provides information regarding the estimated temperature and weather conditions, such as rain, fog, snow, wind or the like, for any of various locations. By way of example, mapping applications for navigational or other purposes may utilize real time weather estimation. In this regard, real time weather estimation may be utilized to provide weather information to users of a navigation system to alert the users as to the weather conditions along their route and at their destination. In some instances, such as in instances in which severe weather conditions, such as substantial amounts of snow, torrential rain or very high winds are forecast, a navigation system may identify an alternative route for the user so that the user can select the alternative route in order to avoid at least some of the severe weather conditions.

Weather data that results from real time weather estimation may be obtained from various commercial sources. However, the weather data that is obtained from commercial sources generally comes at a price. Additionally, the weather data that is available from commercial sources may not be sufficiently granular to provide the desired level of detail for certain applications, such as mapping or navigational applications. In this regard, the weather data available from commercial sources may permit the real time weather conditions to be estimated for a city or a region defined by a zip code, but may not provide the more granular details that may be desirable for mapping and navigational applications. As a result of the acquisition of weather data from commercial sources, the reliability and correspondingly the confidence associated with the weather data may be unknown or at least known with less certainty than may be desirable in some instances. Further, the weather data that is provided by commercial sources may be organized in such a manner that searches of the weather data, such as to identify the weather data associated with a particular location, may be less efficient, more time consuming and more costly in terms of processing resources than is desirable for certain applications, such as those operating in real time or near real time.

BRIEF SUMMARY

A method, apparatus and computer program product are provided in accordance with an example embodiment in order to provide weather-related information in an efficient and reliable manner. In an example embodiment, the method, apparatus and computer program product are configured to provide weather-related information at a granularity that is defined based upon the size of the tiles into which a geographical area is divided. Thus, the weather-related information may be more specifically related to a respective geographical region and, as such, provide a greater level of detail. The method, apparatus and computer program product of an example embodiment are configured to store the weather data or radar data that forms the weather-related information in a data structure that is configured to facilitate the efficient search for weather-related information that is associated with a respective tile, thereby enhancing the timeliness of the retrieval of weather-related information and conserving the processing resources required for such a search.

In accordance with an example embodiment, a method is provided that includes receiving at least one of weather data or radar data and causing the at least one of the weather data or radar data to be stored in a data structure, such as a tree structure. For a respective tile, the method also includes retrieving the at least one of the weather data or radar data from the data structure. The respective tile is one of a plurality of tiles, each of which associated with a respective geographical region. The method further includes determining weather-related information for the respective tile based upon the at least one of the weather data or radar data that was retrieved from the data structure.

The method of an example embodiment further includes defining the plurality of tiles. Each tile is associated with a different respective geographical region. In this example embodiment, the method further includes receiving input defining a size of the plurality of tiles. The method of an example embodiment retrieves the at least one of the weather data or radar data from the data structure by querying the tree structure so as to retrieve the at least one of the weather data or radar data that is within a predefined distance from a respective location. In an example embodiment, the method determines weather-related information by weighting the at least one of the weather data or radar data that was retrieved from the data structure based upon at least one of a distance from a respective location for which weather-related information is to be determined or a time associated with the at least one of the weather data or radar data. The method of an example embodiment also includes identifying weather data values or radar data values that are outliers and excluding weather data values or radar data values identified as outliers from a determination of the weather-related information. In an example embodiment, the method determines weather-related information by identifying one or more tiles associated with hazardous driving conditions based upon the weather-related information. The method of this example embodiment further includes causing an indication of the one or more tiles associated with hazardous driving conditions to be provided.

In another example embodiment, an apparatus is provided that includes at least one processor and at least one memory including computer program code with the at least one memory and computer program code configured to, with the at least one processor, cause the apparatus to receive at least one of weather data or radar data and to cause the at least one of the weather data or radar data to be stored in a data structure, such as a tree structure. For a respective tile, the at least one memory and computer program code are also configured to, with the at least one processor, cause the apparatus to retrieve the at least one of the weather data or radar data from the data structure. The respective tile is one of a plurality of tiles. Each tile is associated with a respective geographical region. The at least one memory and computer program code are further configured to, with the at least one processor, cause the apparatus to determine weather-related information for the respective tile based upon the at least one of the weather data or radar data that was retrieved from the data structure.

The at least one memory and the computer program code are further configured to, with the at least one processor, cause the apparatus of an example embodiment to define the plurality of tiles. Each tile is associated with a different respective geographical region. The at least one memory and the computer program code are further configured to, with the at least one processor, cause the apparatus of an example embodiment to receive input defining a size of the plurality of tiles. The at least one memory and the computer program code are also configured to, with the at least one processor, cause the apparatus of an example embodiment to retrieve the at least one of the weather data or radar data from the data structure by querying the tree structure so as to retrieve the at least one of the weather data or radar data that is within a predefined distance from a respective location.

The at least one memory and the computer program code are configured to, with the at least one processor, cause the apparatus of an example embodiment to determine weather-related information by weighting the at least one of the weather data or radar data that was retrieved from the data structure based upon at least one of a distance from a respective location for which weather-related information is to be determined or a time associated with the at least one of the weather data or radar data. The at least one memory and the computer program code are further configured to, with the at least one processor, cause the apparatus of an example embodiment to identify weather data values or radar data values that are outliers and exclude weather data values or radar data values identified as outliers from a determination of the weather-related information. The at least one memory and the computer program code are configured to, with the at least one processor, cause the apparatus of an example embodiment to determine weather-related information by identifying one or more tiles associated with hazardous driving conditions based upon the weather-related information. The at least one memory and the computer program code are further configured to, with the at least one processor, cause the apparatus of this example embodiment to cause an indication of the one or more tiles associated with hazardous driving conditions to be provided.

In a further example embodiment, a computer program product is provided that includes at least one non-transitory computer-readable storage medium having computer-executable program code portions stored therein with the computer-executable program code portions comprising program code instructions configured to receive at least one of weather data or radar data and to cause the at least one of the weather data or radar data to be stored in a data structure, such as a tree structure. For a respective tile, the computer-executable program code portions also include program code instructions configured to retrieve the at least one of the weather data or radar data from the data structure. The respective tile is one of a plurality of tiles. Each tile is associated with a respective geographical region. The computer-executable program code portions further include program code instructions configured to determine weather-related information for the respective tile based upon the at least one of the weather data or radar data that was retrieved from the data structure.

In an example embodiment, the program code instructions configured to retrieve the at least one of the weather data or radar data from the data structure include program code instructions configured to query the tree structure so as to retrieve the at least one of the weather data or radar data that is within a predefined distance from a respective location. The program code instructions configured to determine weather-related information include, in an example embodiment, program code instructions configured to weight the at least one of the weather data or radar data that was retrieved from the data structure based upon at least one of a distance from a respective location for which weather-related information is to be determined or a time associated with the at least one of the weather data or radar data.

In yet another example embodiment, an apparatus is provided that comprises means for receiving at least one of weather data or radar data and means for causing the at least one of the weather data or radar data to be stored in a data structure, such as a tree structure. For a respective tile, the apparatus also includes means for retrieving the at least one of the weather data or radar data from the data structure. The respective tile is one of a plurality of tiles, each of which associated with a respective geographical region. The apparatus further includes means for determining weather-related information for the respective tile based upon the at least one of the weather data or radar data that was retrieved from the data structure.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

A method, apparatus and computer program product are provided in accordance with an example embodiment in order to provide weather-related information for a respective geographical region. The weather-related information may be utilized for various applications. For example, the weather-related information may be utilized in conjunction with mapping application, such as for navigational purposes or otherwise, in order to provide additional information to a user regarding the weather for a particular geographical region, such as along the route to be traveled by the user. Additionally, the method, apparatus and computer program product of an example embodiment may identify weather-related information associated with hazardous driving conditions and may provide an indication of the geographical regions that may be subject to the weather-related hazardous driving conditions. As such, a user may plan a different route in order to avoid the geographical regions that may experience the hazardous driving conditions or the user may continue along the intended route but may exercise even more caution when driving through the geographical region that is subject to the hazardous driving conditions.

Figure 1:
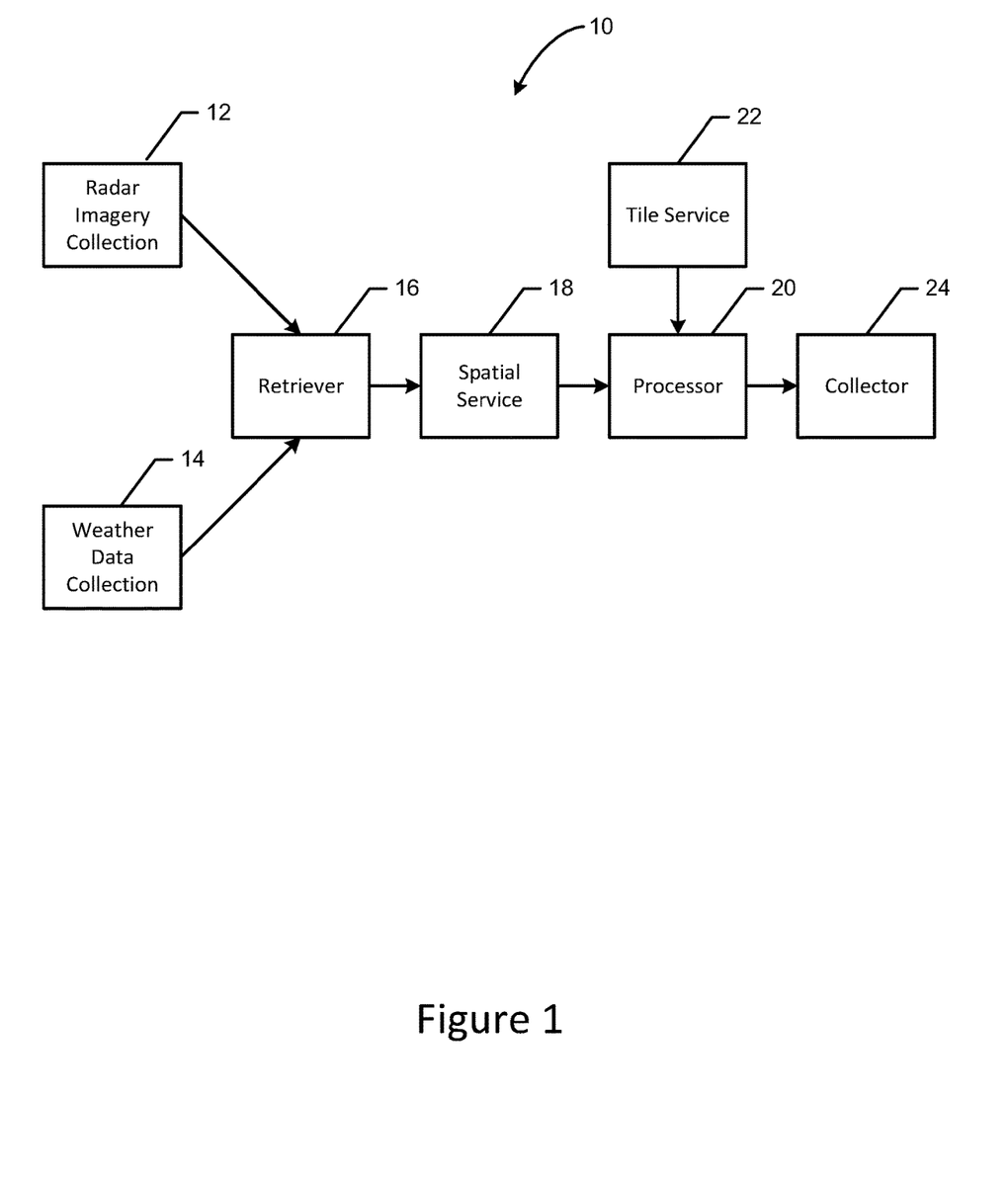
FIG. 1 is a block diagram of a system specifically configured in accordance with an example embodiment of the present disclosure in order to determine weather-related information on a tile basis.

Referring now to FIG. 1, a system 10 that is configured to provide weather-related information for a respective geographical region is depicted. The data upon which the weather-related information is based may include radar data and/or weather data. Radar data includes radar imagery and is provided by one or more weather radar stations, such as weather radar stations located throughout the United States, Europe and elsewhere. The radar imagery may be stored as a radar imagery collection 12. The radar imagery may be captured repeatedly, such as on a periodic basis, e.g., every five minutes, with radar images being captured by each of the radar weather stations and provided for storage within the radar imagery collection.

The radar data provides precipitation data with each pixel of a radar image providing information regarding the precipitation intensity at the geographic location corresponding to the respective pixel of the radar image. In addition to the precipitation data provided by a radar image, information is preferably provided with the radar image that identifies the time at which the radar image was captured and/or the age of the radar image as well as information identifying the location associated by the radar image.

The weather data includes information provided by a plurality of weather stations relating to various weather parameters in the vicinity of a respective weather station. For example, the weather data may include information relating to the air temperature, dew point temperature, humidity, atmospheric pressure, visibility, and precipitation type proximate a respective weather station. The weather data may be captured by a weather station repeatedly, such as periodically, and the weather data may be read from the weather stations on a repeated, such as periodic, basis, such as every 15 minutes. In this regard, each weather station may serve as an eXtensible Markup Language (XML) source and the weather data provided by a respective weather station may be read by the system 10, such as via an XML-based application programing interface (API), and transmitted over a network, such as the internet, a cellular network, etc. In addition to the weather data, information may be provided with the weather data identifying the time that weather data was collected and the location at which the weather data was collected.

In some embodiments, the weather data that is collected may be provided in units that are different than the units utilized by the weather-related information that is provided to a user in accordance with an example embodiment. As such, the weather data that is received may be converted by the weather data collection 14 or the retriever 16 as described below such that the units associated with the converted weather data correspond to those utilized by the weather-related information provided to a user in accordance with an example embodiment. By way of example, weather data may include a temperature in Celsius and pressure in millimeters and may be subjected to a conversion such that the temperature is expressed in Fahrenheit and the pressure is expressed in inches in order to be consistent with units utilized by the weather-related information. As shown in FIG. 1, the weather data that is received from the weather stations, such as following any conversion of the units of the weather data, is stored as a weather data collection.

In the example embodiment depicted in FIG. 1, the system 10 also includes a retriever 16 to obtain radar data from the radar imagery collection 12 and weather data from the weather data collection 14. In some embodiments, the retriever is configured to trigger the radar imagery collection and the weather data collection to be updated by obtaining more current radar data from radar weather stations and more current weather data from weather stations prior to providing the radar data and the weather data to the retriever. In another embodiment, however, the radar imagery collection and the weather data collection remain current such that the retriever obtains radar data and weather data from the radar imagery collection and the weather data collection, respectively, without triggering updating by the radar imagery collection and the weather data collection. In some embodiments, the retriever is also configured to define valid data ranges for different types of weather data and to exclude from further consideration weather data that fail to satisfy the valid data range. For example the valid data range for air temperature may be more than −200° C., such as that the retriever of this example embodiment is configured to exclude weather data in the form of an air temperature of −500° C. In some embodiments, the valid data ranges utilized by the retriever in order to exclude erroneous weather data are defined based upon the geographic location. For example, a different data range may be established for temperatures in cold climates, as opposed to temperatures in tropical climates.

The system 10 of FIG. 1 also includes a spatial service 18 configured to organize the radar data and the weather data in a data structure to facilitate timely and efficient spatial querying of the weather data and the radar data. Further, the system 10 includes a tile service 22 configured to divide a geographical area, such as a country, a continent or some smaller geographical area, into a plurality of tiles, such as a plurality of tiles of the same size and shape. In an example embodiment, the tile has a predefined shape, such as rectangular or square. The tile of this example embodiment also has a size that is defined based upon the granularity of the weather-related information that is to be provided.

In an embodiment in which the weather-related information is to be utilized by a mapping or navigational application, the tile service 22 may be configured to construct tiles for only those geographical regions that include a roadway, such as a roadway classified as function class (FC) 1, FC2, FC3, FC4 or FC5. As such, tiles associated with geographical regions that encompass only a body of water need not be created as the information associated with such tiles would not be utilized in conjunction with a navigational application. The tile service may be configured to be updated in response to an indication that a map for a geographical area with which the tiles created by the tile service are associated, has been updated, such as by the addition or removal of links thereto. In an example embodiment, the tile service is configured to operate in an offline manner and to be updated based upon updates to a corresponding map without impacting the determination of weather-related information in accordance with an example embodiment to the present disclosure.

The system 10 of FIG. 1 also includes a processor 20 for spatially querying the data structure into which the spatial service 18 has organized the weather data and the radar data in order to retrieve the weather data and the radar data that is relevant for a respective tile and, correspondingly, the geographical region associated with the respective tile. Based upon the weather data and radar data that are provided to the processor in response to spatial querying of the data structure, the processor is configured to determine various weather-related information for the respective tile.

The system 10 of this example embodiment also includes a collector 24 to receive the weather-related information provided by the processor 20 and to correspondingly format the weather-related information for a user. In this regard, the collector may be responsive to an API call from an API service of a customer requesting to access the weather-related information for a particular location or region of interest, such as a particular link, city or the like. As such, the collector is configured to provide a list of the tiles and the weather-related information associated with each respective tile. In this regard, the collector may receive input regarding a particular location or a particular region and may provide weather-related information for the particular location or the particular region, such as a country, continent or other region defined by a bounding box. For example, the weather-related information may be provided, such as an XML, JavaScript Object Notation (JSON) or Comma Separated Values (CSV) file, for the tiles that correspond to the location or region of interest.

Figure 2:
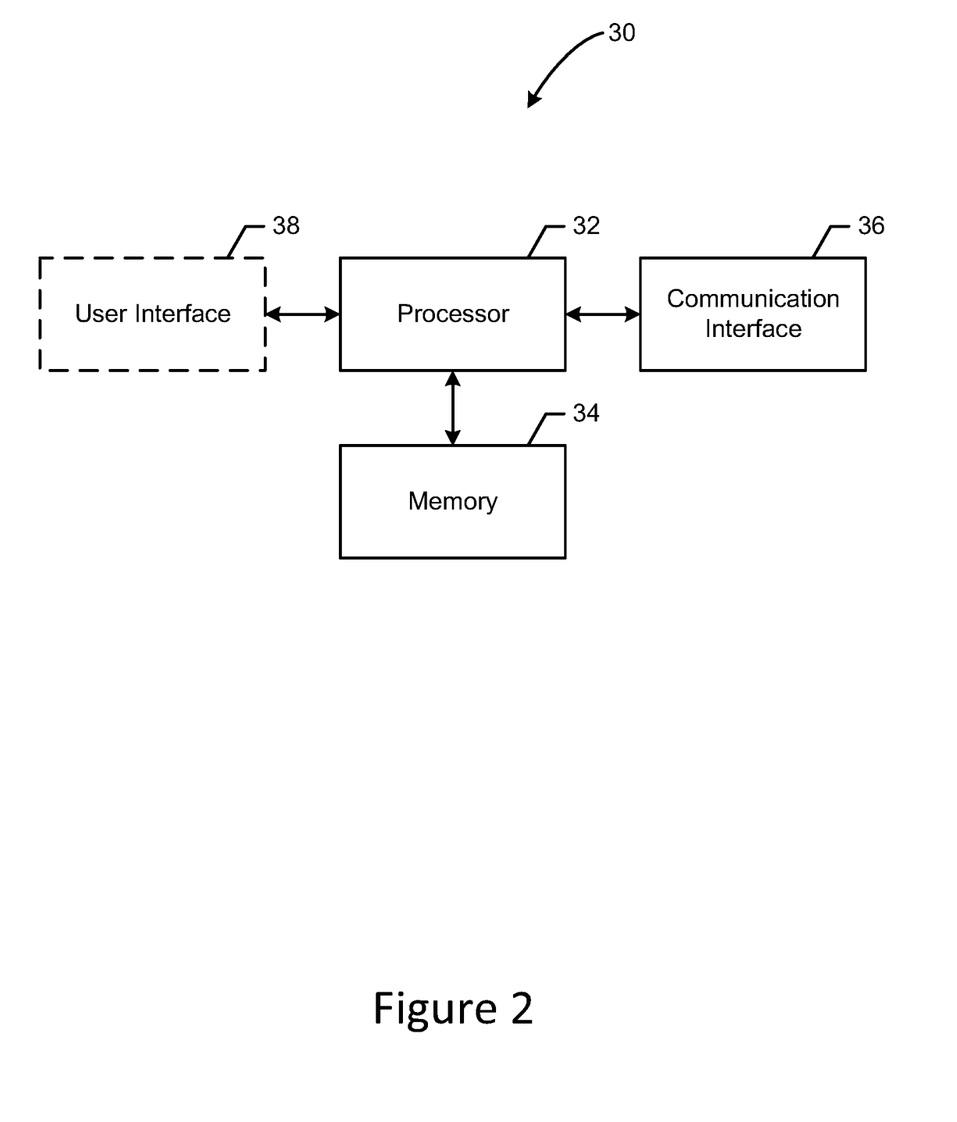
FIG. 2 is a block diagram of an apparatus that may be specifically configured in accordance with an example embodiment of the present disclosure in order to implement the system of FIG. 1.

The system 10 of FIG. 1 may be embodied in various manners. For example, an apparatus 30 as shown in FIG. 2 may embody the system of FIG. 1 or at least components of the system of FIG. 1. The apparatus of FIG. 2 may, in turn, be embodied by any of various computing devices, such as a personal computer, a computer workstation, a laptop computer, a tablet computer or a mobile terminal, such as a smartphone or the like, that are configured to retrieve and process weather-related information. Alternatively, the computing device that embodies the apparatus may include a mapping or navigation system, an advanced driver assistance system (ADAS), a global positioning system (GPS) or the like. Regardless of the type of computing device that embodies the apparatus, the apparatus of an example embodiment may include, may be associated with or may otherwise be in communication with a processor 32, a memory device 34, a communication interface 16 and optionally a user interface 38, as shown in FIG. 2.

In some embodiments, the processor 32 (and/or co-processors or any other processing circuitry assisting or otherwise associated with the processor) may be in communication with the memory device 34 via a bus for passing information among components of the apparatus 30. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device therefore serves as a computer-readable storage medium, which refers to a physical storage medium (e.g., volatile or non-volatile memory device), and is differentiated from a computer-readable transmission medium, which refers to an electromagnetic signal. The memory device may be configured to store information, data, content, applications, instructions, or the like for enabling the apparatus to carry out various functions in accordance with an example embodiment. For example, the memory device could be configured to buffer input data for processing by the processor. Additionally or alternatively, the memory device could be configured to store instructions for execution by the processor. In relation to the system 10 of FIG. 1, the memory device of an example embodiment is configured to embody, in whole or in part, the radar imagery collection 12 and/or the weather data collection 14.

As noted above, the apparatus 30 may be embodied by a computing device including those described above. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment on a single chip or as a single "system on a chip." As such, in some cases, a chip or chipset may constitute means for performing one or more operations for providing the functionalities described herein.

In relation to the system 10 of FIG. 1, the processor 32 of an example embodiment is configured to embody, in whole or in part, the retriever 16, the spatial service 18, the processor 20, the tile service 22 and/or the collector 24. The processor may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 32 may be configured to execute instructions stored in the memory device 34 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment by further configuration of the processor by instructions for performing the algorithms and/or operations described herein. The processor may include, among other things, a clock, an arithmetic logic unit (ALU) and logic gates configured to support operation of the processor.

The apparatus 30 of an example embodiment also includes a communication interface 36 which, in turn, may at least partially embody the retriever 16 of the system 10 of FIG. 1. The communication interface may be any means such as a device or circuitry embodied in either hardware or a combination of hardware and software that is configured to receive and/or transmit data from/to other electronic devices in communication with the apparatus, such as by being configured to receive spatial data or a representation of spatial data from a server or other data source. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As illustrated by the dashed outline in FIG. 2, the apparatus 30 may also optionally include or otherwise be in communication with a user interface 38 configured to display, for example, a representation of the weather-related information such as in conjunction with a map display, e.g., in conjunction with a route defined by a map display. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 12 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 34 and/or the like).

Figure 3:
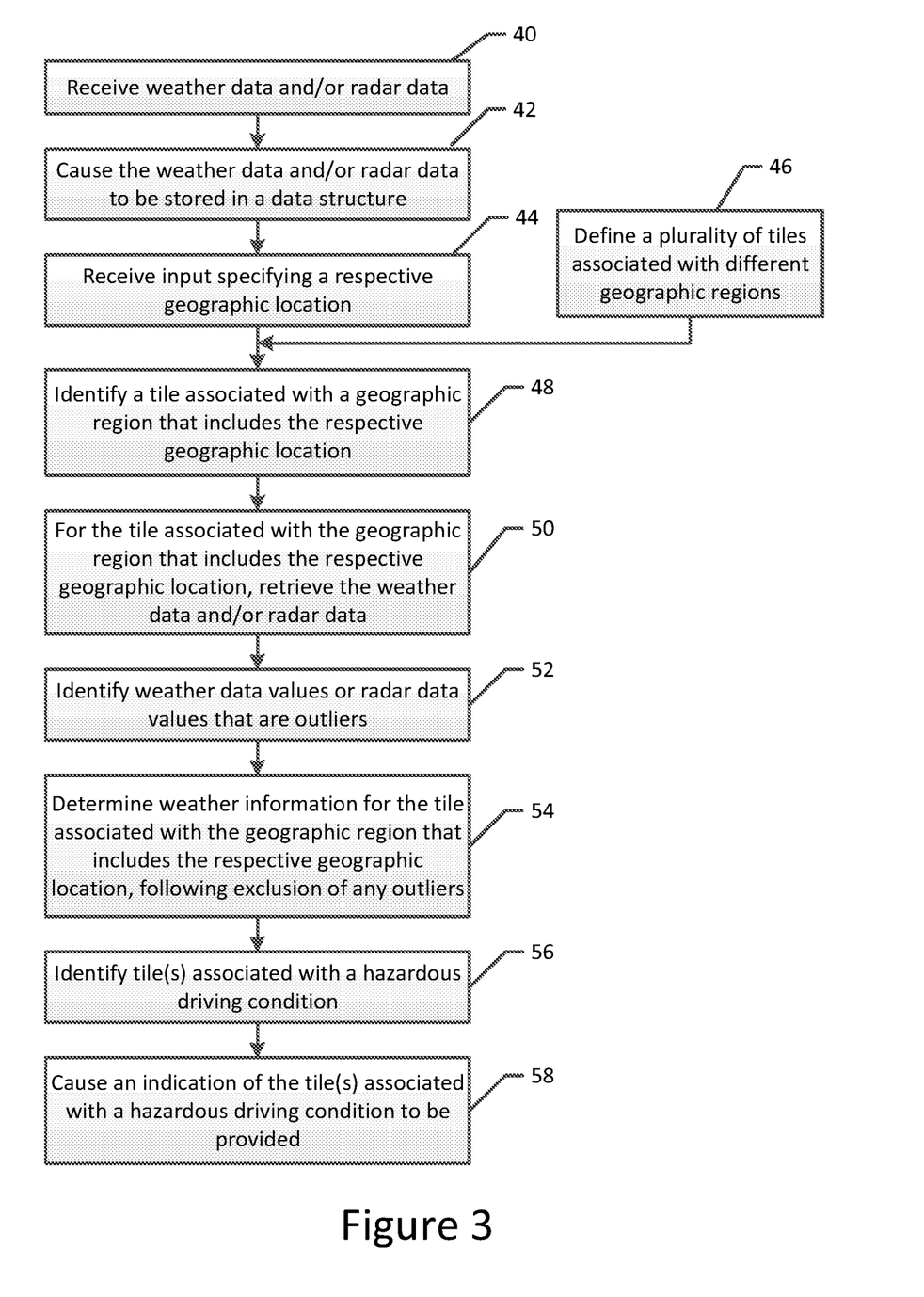
FIG. 3 is a flowchart illustrating operations performed, such as by the apparatus of FIG. 2, in accordance with an example embodiment of the present disclosure.

Referring now to FIG. 3, the operations performed, such as by the apparatus 30 of FIG. 2 embodying the system 10 of FIG. 1, are depicted in accordance with an example embodiment. In this regard, the apparatus includes means, such as the processor 32, the communication interface 36 or the like, for receiving at least one of weather data or radar data. In some example embodiments, the apparatus is configured to receive both weather data and radar data. As described above, the radar data may be received from one or more radar stations positioned at different locations in the form of radar images captured at different points in time. Similarly, the weather data is received from one or more weather stations and includes a variety of different types of weather data including one or more of air temperature, dew point temperature, humidity, visibility, atmospheric pressure and precipitation type. Each weather station is positioned at a different location and captures weather data at each of a plurality of different instances in time.

The radar data and the weather data that are received may be stored in a radar imagery collection 12 and a weather data collection 14, respectively, as shown in FIG. 1. The memory device 34 or other local storage device accessible to the processor 32 may be configured to store the radar imagery collection and the weather data collection. In an example embodiment, the radar imagery collection and the weather data collection are stored by the memory device or other local storage device so as to be readily accessible to the processor for a predefined period of time following the receipt of the radar data and the weather data. Once the radar data and the weather data have been stored by the memory device or other local storage device for at least the predefined period of time, such as at least a predetermined number of days as defined by a user or system operator, the radar data and the weather data may be archived so as to then be stored by a lower cost storage device that is accessible by the apparatus 10, such as the processor, albeit in a more delayed fashion than the access provided by the storage of the radar imagery collection and the weather data collection by the memory device or other local storage device. By archiving the radar data and the weather data have been stored by the memory device or other local storage device for at least the predefined period of time, the memory device or other local storage device is able to store more recent radar data and weather data. In some example embodiment, once the radar data and the weather data are of at least a predefined age, such as may be defined by a user or the system operator, the radar data and the weather data may be deleted from the lower cost storage device, thereby permitting the lower cost storage data to store more recent radar data and weather data.

With respect to the radar data, information regarding the location represented by the radar data, that is, the location represented by a radar image as well as the time at which the radar data was captured may be stored with or otherwise in association with the radar image. Similarly, with respect to the weather data, information regarding the location associated with the weather data, that is, the location of the weather station that collected the weather data as well as the time at which the weather data was captured may be stored with or otherwise in association with the weather data. As noted above, weather data that is received having units that differ from the units with which the apparatus 30, such as the processor 32, is configured to utilize may be converted, such as by the processor, in order to have a common unit basis prior to storage for the weather data. The apparatus of an example embodiment also includes means, such as the processor, for excluding weather data that falls outside a predefined data range. As noted above, the predefined data range may be location dependent and, in one embodiment, is established by a user or the system operator. By excluding weather data that falls outside a predefined data range, erroneous data values, such as temperatures of more than 500° Celsius or less than 500° Celsius, may be excluded from further consideration.

As shown in block 42 of FIG. 3, the apparatus 30 includes means, such as the processor 32, the memory device 34 or the like, for causing at least one of the radar data or the weather data to be stored in a data structure. In an example embodiment, the weather data is stored on a first data structure and the radar data is stored on a second, different data structure. The data structure of an example embodiment is a tree structure, such as a quadtree or an R-tree utlzed for spatial access techniques. Thus, the weather data may be stored in a first tree structure, such as a first R-tree, and the radar data may be stored in a second tree structure, such as a second R-tree. The data structure, such as the tree structure, e.g., the R-tree, may be updated in response to the receipt of the additional weather data or radar data. As described below, tree structures, such as R-trees, may be efficiently queried in order to provide results, such as relevant weather data or relevant radar data, in a computationally efficient and timely manner. In this regard, tree structures, such as R-trees, support spatial querying in which weather data or radar data located at or near, such as within a predefined distance, e.g., radius, of, a specified location may be efficiently retrieved. For R-Trees having a number n of entries, the search time of an R-tree is $O(\log(n))$ which is substantially less than the search time $O(n)$ of a linear search of a linear data structure for R-trees including large numbers n of entries. As such, reliance upon tree structures, such as R-trees, to store the weather data and the radar data results in efficient searches that are not only timely, but that consume significantly less processing resources than other search techniques, such as linear searches of linear data structures.

Figure 4:
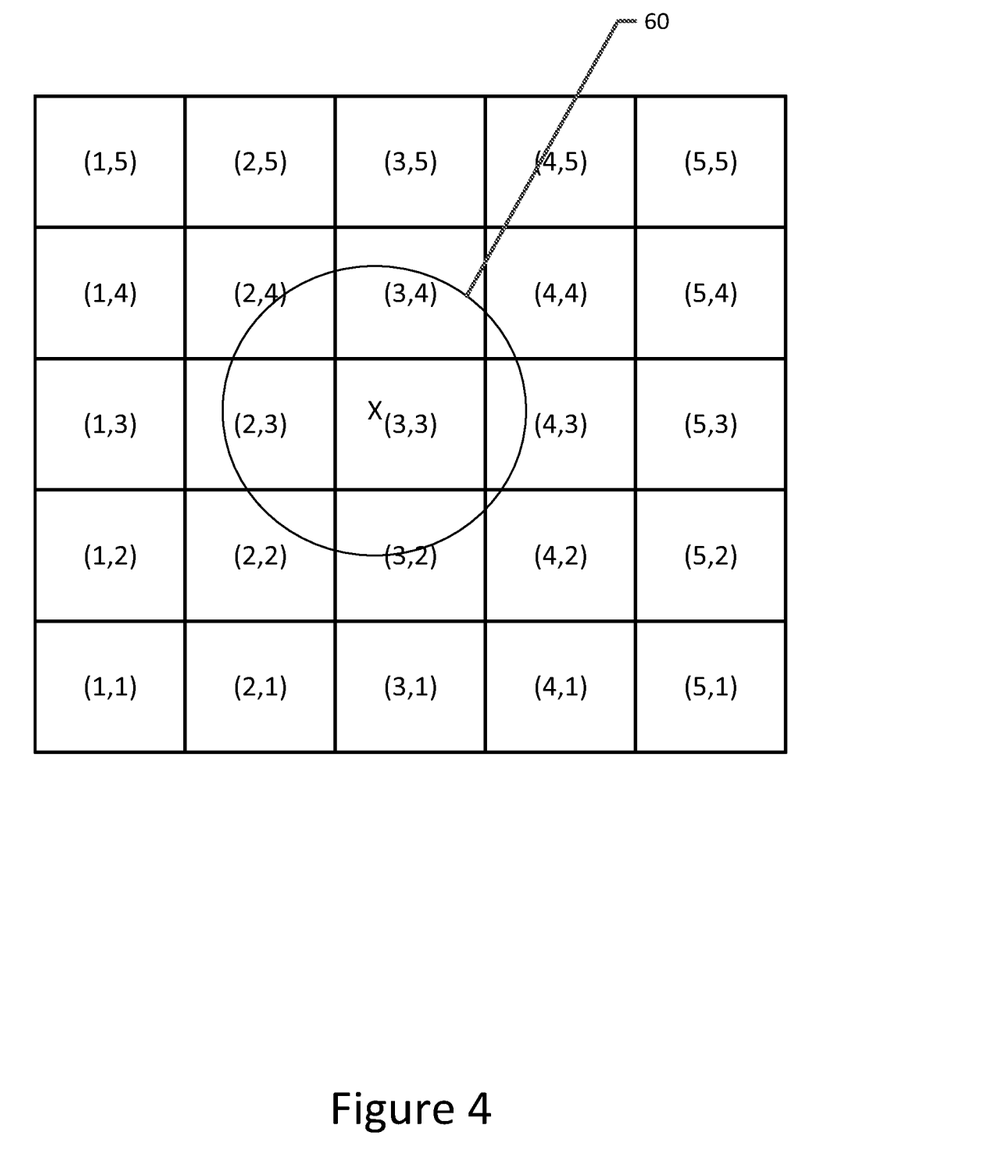
FIG. 4 is a graphical representation of a plurality of tiles representative of different geographical regions.
Figure 5A:
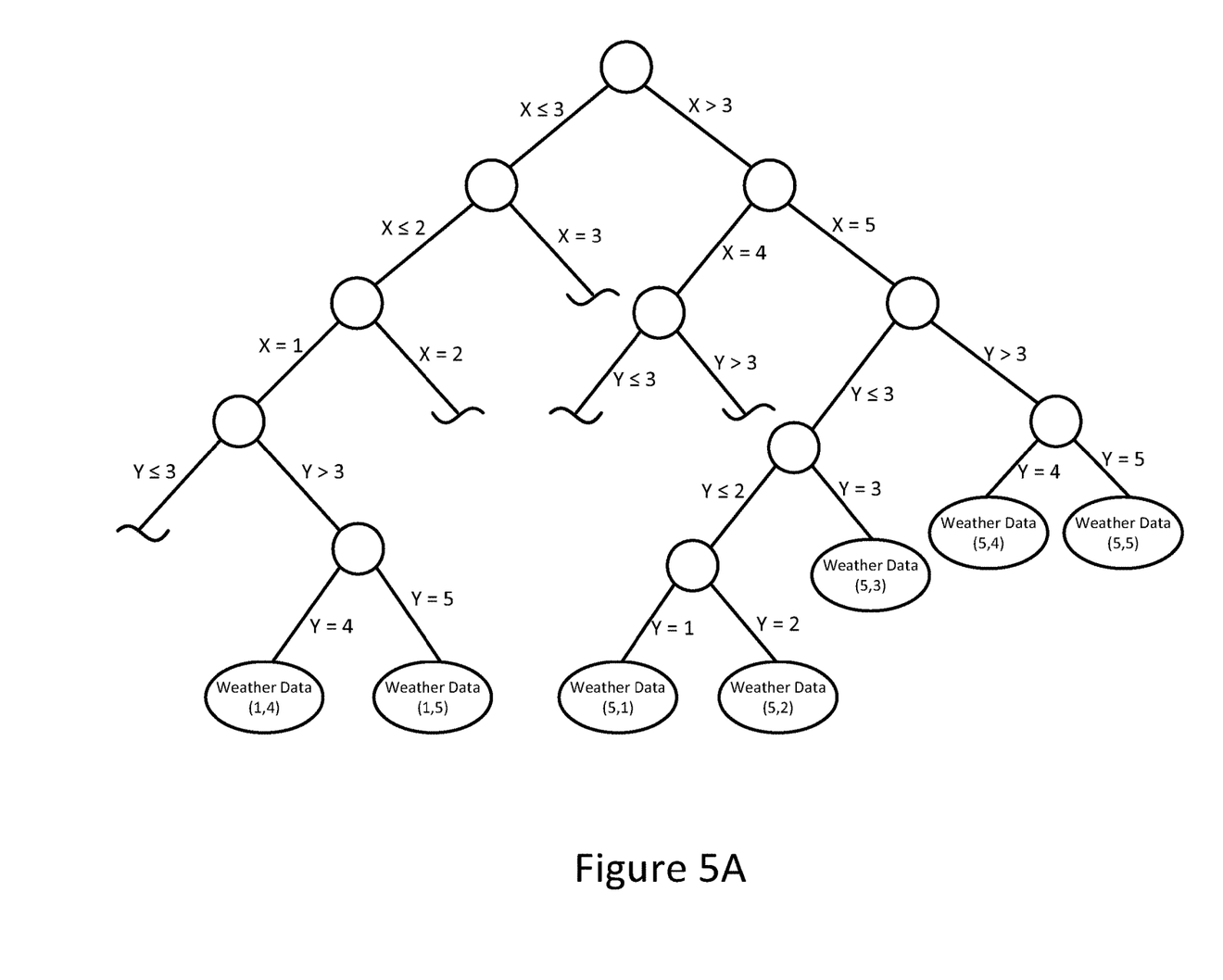
FIGS. 5A and 5B are graphical representations of tree structures for weather data and radar data, respectively, associated with the plurality of tiles of FIG. 4 in accordance with an example embodiment of the present disclosure.
Figure 5B:
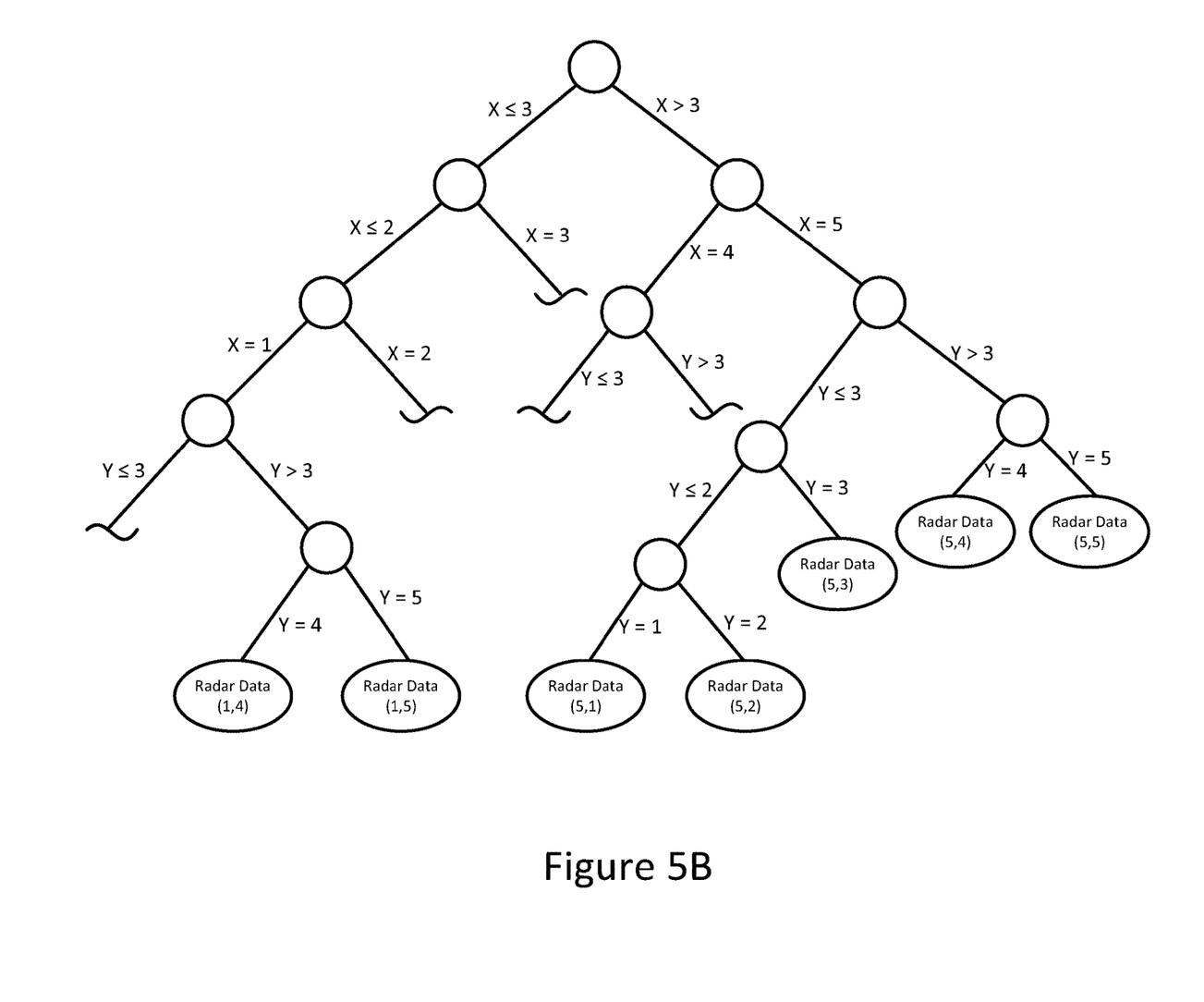

By way of example of R-Trees in which the weather data and radar data are stored, reference is made to FIGS. 5A and 5B with respect to weather data and radar data, respectively. The R-trees of FIGS. 5A and 5B are prepared in conjunction with the tiles of FIG. 4 designated (x, y) based upon the relative locations of the tiles. As shown with respect to weather data, the R-tree of FIG. 5A permits spatial querying based upon the location of the tile in question, such as defined by the (x, y) coordinates associated with the tile. Consequently, based upon the coordinates of a tile, the R-tree may be quickly searched and the weather data associated with the respective tile may be identified, such as weather data (1, 5) for tile (1, 5). In instances in which multiple tiles are identified, such as the tiles within a predefined distance of the geographic locations specified by the input, the weather data associated with the multiple tiles may be quickly located and retrieved. Similarly, FIG. 5B depicts the comparable R-tree for radar data based upon the coordinates of the respective tiles with which the radar data is associated. As will be readily apparent, most geographic areas include many more tiles than the 25 tiles of FIG. 4 such that the resulting R-trees for the weather data and the radar data are correspondingly much larger. However, the larger R-trees may be efficiently spatially searched for the relevant weather data and radar data in a much more efficient and timely manner than the searches of other, more linear data structures storing comparable amounts of weather data and radar data. As such, the storage of weather data and radar data in the tree structures, such as R-trees, conserves the processing resources required to search the tree structures.

As described above in conjunction with the tile service 22, the apparatus 30 also includes means, such as the processor 32 or the like, for defining a plurality of tiles associated with different geographic regions. See block 46 of FIG. 3. As noted above, the tiles can have any of various shapes, such as rectangular or square shapes, and may have any of various sizes, such as may be defined by a user or system operator. The tiles generally, however, have the same size and same shape, such as a square shape with a side length of 1 kilometer (km), 5 km or the like. As such, the apparatus of an example embodiment also includes means, such as the user interface 38, the processor or the like, for receiving input defining a size of the plurality of tiles, such as a side length of a square tile. The tiles are generally defined so as to adjacent one another in order to completely cover a geographic area. See, for example, FIG. 4 in which 25 tiles are depicted. In this regard, the example of FIG. 4 separately designates each tile by a coordinate pair (x, y) in which x and y are the horizontal and vertical offsets, respectively, from a reference point, such as the lower left hand corner of the tile arrangement. Each tile represents a different respective geographic region and, as such, is associated with a respective location. For example, each tile has a centroid with the centroid, in turn, being associated with a respective location within the geographical region with which the tile is associated. In an example embodiment, the apparatus, such as the processor, is configured to exclude tiles that the do not include a roadway, such as a roadway designated as FC1, FC2, FC3, FC4, or FC5, such that tiles that are associated only with a body of water and that do not include a roadway are excluded from further consideration as the radar data and weather data associated with such tiles are generally immaterial with respect to driving conditions.

As shown in block 44 of FIG. 3, the apparatus 30 of an example embodiment includes means, such as user interface 38, the processor 32 or the like, for receiving input specifying a respective geographic location, such as a geographic location for which weather data and radar data is of interest. Input may be provided by a user interested in weather conditions at a particular location. Alternatively, in an instance in which the weather conditions are to be determined in conjunction with a navigation application so as to determine the driving conditions along a route, the definition of the route by the navigation system may, in turn, define the geographic location for which the weather conditions are of interest, that is, along the entirety of the route. The apparatus of this example embodiment also includes means, such as the processor or the like, for identifying one or more tiles associated with geographic region(s) that include the respective geographic location specified by the input. See block 48. In the example of FIG. 4 in which the geographic location specified by the input is designated by X, the tile designated (3, 3) is identified as including the respective geographic location.

The apparatus 30 of this example embodiment also includes means, such as the processor 32, the memory device 34 or the like, for retrieving at least the weather data or the radar data from the data structure for the tile associated with the geographic region that includes the respective geographic location specified by the input. See block 50 of FIG. 3. In an example embodiment, the weather data and the radar data may not only be retrieved for the particular tile that includes the geographic location specified by the input, but the apparatus, such as the processor, the memory device or the like, is also configured to retrieve the weather data and the radar data for one or more additional tiles within a predefined region, such as within a predefined distance, e.g., radius, of the tile that includes the respective geographic location specified by the input. In the example of FIG. 4, a circle 60 of a predefined radius about the geographic location X specified by the input is defined. As shown, the circle of the predefined radius extends through a plurality of tiles about the tile (3,3) that includes the geographic location X specified by the input. In this example embodiment, the apparatus, such as the processor, also retrieves the weather data and the radar data for each tile through which the circle passes as well as any tiles wholly within the circle including tiles (2,2), (2,3), (2,4), (3,4), (4,4), (4,3), (4,2) and (3,2) in the example of FIG. 4. As will be understood, the distance about the geographic location specified by the input may be differently defined, such as a by a user or the system operator, and, as such, may define differently shaped regions as opposed to the circle of FIG. 4 which is provided by way of example, but not of limitation.

As shown in block 52 of FIG. 3, the apparatus 30 of an example embodiment also includes means, such as the processor 32 or the like, for identifying weather data values and/or radar data values that are outliers. The weather data values and the radar data values may be identified as outliers in different manners. In an example embodiment, however, predefined data ranges or thresholds may be established and the weather data and radar data may be compared to the predefined data ranges or thresholds with weather data or radar data that fails to satisfy the predefined data ranges or thresholds being identified as an outlier and excluded from further consideration during the determination of weather information. Although the predefined data ranges or thresholds may be provided by user or system operator, the predefined data ranges or thresholds may be based upon other weather data values and radar data values in the proximity, such as the average weather data value or the average radar data value, for all tiles within a predefined number, e.g., three, tiles of the tile for which the weather data value or radar data value is being processed for purposes of identifying outliers with the data values that are more than 1 standard deviation away from the average weather data value or the average radar data value being considered an outlier.

As shown in block 54 of FIG. 3, the apparatus 30 also includes means, such as the processor 32 or the like, for determining weather-related information for the respective tile based upon the weather data and such/or the radar data that was retrieved from the data structure. In an example embodiment, the apparatus includes means, such as the processor or the like, for weighting the weather data and/or the radar data that was retrieved from the data structure based upon a distance from the respective geographic location specified by the input for which the weather-related information is to be determined and/or based upon a time associated with the weather data and/or the radar data. Although the apparatus, such as the processor, may be configured to weight to radar data and/or the radar data based upon distance and/or time in various manners, the apparatus, such as the processor, of an example embodiment weights the weather data and/or the radar data such that the confidence in the data and, therefore, the weight associated with the data decays with increasing distance and with increasing time, such as by decaying exponentially with increasing distance and increasing time. Thus, weather data and radar data that is further from the respective geographic location specified by the input is weighted less than weather and radar data that is closer to the respective geographic location specified by the input. Correspondingly, weather data and radar data that is older in terms of its time of capture is weighted less than weather data and radar data that was captured more recently. The weather data and the radar data is therefore weighted and aggregated for each of the tiles that were identified to be associated with the geographic region that includes the respective geographic location specified by the input.

With respect to weather data, each different weather parameter, such as air temperature, pressure, etc., is identified for each tile associated with the geographic region that includes the respective geographic location specified by the input. Each different weather parameter of each of the identified tiles is then weighted, such as by assigning weights that decay based on increases in distance and time from the geographic location specified by the input. The weighted weather parameters of the tiles that have been identified to be associated with the geographic region that includes the geographic location specified by the input are then individually aggregated, such as by being averaged, to define the estimation of the weather parameters for the geographic location specified by the input. This process may be repeated for each different weather parameter as well as for the radar data in order to generate the weather-related information. Relative to the radar data, each radar image is associated with a time at which the image was captured and each pixel of each radar image is associated with a geographic location, such as expressed in latitude and longitude. As such, the apparatus, 30, such as the processor 32, is configured to determine the distance from the geographic location specified by the input and/or the time elapsed since its capture for each pixel of the radar images. Based on the distance and/or time associated with each pixel of the radar images in proximity to the geographic location specified by the input, the apparatus, such as the processor, is configured to determine the weight to be assigned to each pixel of the radar images with the weighted pixel values representative of precipitation intensity then being summed to define the estimation of the precipitation intensity for the geographic location specified by the input. In some embodiments, the apparatus 30, such as the processor 32, may also be configured to determine other types of weather-related information including the solar radiation and/or the pavement temperature or other pavement conditions for the geographic region with which a tile is associated.

The apparatus 30, such as the processor 32, the memory device 34 or the like, may be configured to store the weather-related information and to determine and store a confidence value associated with the weather-related information for a respective geographic location. In this regard, the confidence value may be based upon and may have a direct relationship to the number of weather stations or radar stations contributing to the weather-related information for the geographic location specified by the input with greater confidence being associated with weather-related information that is based on greater numbers of weather stations and radar stations when weather-related information is based on a fewer number of weather stations and radar stations. The confidence value associated with weather-related information may also be based upon the weights that were determined and applied as described above. For example, the confidence value may be directly related to the weights such that the greater the weights then the greater the confidence. In this manner, as the distance between the geographic location specified by the input and the source, e.g., radar or weather stations, increases, the weight attributable to distance decreases which effectively reduces the confidence value. Further, as the age of the weather data or the radar data increases, the weight attributable to time also decreases which effectively reduces the confidence. In some embodiments, the confidence value may be normalized to facilitate comparison between the confidence values associated with the weather-related information for different locations. As such, the apparatus, such as the processor, the memory device or the like, may be configured to store the weather-related information that is determined along with an indication of the tile, such as the centroid of the tile, with which the weather-related information is associated as well as a confidence value for the weather-related information. The weather-related information may then be provided upon request.

Although the weather-related information may be utilized for a variety of different purposes, the weather-related information may be utilized in one example embodiment in conjunction with a navigation application such that weather-related information along the route to be travelled as defined by the navigation application is provided to the user. For example, the weather-related information may be displayed, such as by the user interface 38, concurrently with the navigational information, such as the route, such as either as an overlay upon the navigational display or in an inset within the navigational display. In addition to merely presenting the weather-related information, the apparatus 30, such as the processor 32 of an example embodiment may also identify hazardous driving conditions. In this regard, the apparatus also includes means, such as the processor or the like, for identifying one or more tiles associated with hazardous driving conditions based upon the weather-related information. See block 56 of FIG. 3. The hazardous driving conditions may be identified in various manners. For example, various combinations of the weather parameters may be pre-established to define dangerous driving conditions. For example, precipitation in the form of snow and temperatures below freezing may be pre-established to define a dangerous driving condition. As another example, precipitation in the form of rain having an intensity greater than a predefined value may also be pre-established to define a dangerous driving condition.

In an example embodiment, the apparatus 30 also includes means, such as the processor 32, the user interface 38 or the like, for causing an indication of the one or more tiles associated with hazardous driving conditions to be provided. For example, that portion in the navigational display that corresponds to a tile associated with hazardous driving conditions may be colored or shaded in a manner that designates the existence of hazardous driving conditions. As such, a user may be alerted to hazardous driving conditions and may either alter their driving behavior or take another route. In this regard, the apparatus, such as the processor or the like, of an example embodiment may identify instances in which the route planned by a navigation system passes through one or more tiles associated with hazardous driving conditions. And, in these instances, the apparatus, such as the processor, may be configured to determine an alternative route from the origin, such as the current location of the user, to the destination that includes a different series of roadways that do not pass through tiles associated with hazardous driving conditions. In this example embodiment, the alternative route may be presented to the user as an option if the user wishes to avoid the geographic region susceptible to hazardous driving conditions.

As described above, FIG. 3 illustrates a flowchart of an apparatus 20, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 24 of an apparatus employing an embodiment of the present invention and executed by the processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A method comprising:
receiving at least one of weather data or radar data, wherein the weather data or radar data is captured by one or more remote weather stations or weather radar stations positioned at different locations;
causing the at least one of the weather data or radar data to be stored in a data structure, wherein causing the at least one of the weather data or radar data to be stored comprises causing the at least one of the weather data or radar data to be stored in a tree structure organized based on relative locations of a plurality of tiles, each tile of the plurality of tiles being associated with a respective geographical region;
receiving input specifying a respective location and identifying a respective tile of the plurality of tiles that includes the respective location;
for the respective tile, retrieving the at least one of the weather data or radar data from the data structure, wherein the respective tile is one of the plurality of tiles and includes the respective location;

retrieving at least one of additional weather data or additional radar data from the data structure for at least one additional tile of the plurality of tiles based at least in part on the tree structure, wherein the at least one additional tile is located at least partially within a predefined region corresponding to the respective location and the at least one additional tile is a different tile than the respective tile; and determining, with a processor, weather-related information for the respective location based upon a weighted aggregation of both (a) the at least one of the weather data or radar data that was retrieved from the data structure for the respective tile that includes the respective location and (b) the at least one of the additional weather data or additional radar data that was retrieved from the data structure for the at least one additional tile, wherein a respective weight used to perform the weighted aggregation decreases with increasing distance between the respective location and a location of a source of the at least one of the weather data or radar data or the at least one of the additional weather data or additional radar data.

2. A method according to claim 1 further comprising defining the plurality of tiles, each tile being associated with a different respective geographical region.

3. A method according to claim 1 wherein retrieving the at least one of the weather data or radar data from the data structure comprises querying the tree structure so as to retrieve the at least one of the weather data or radar data that is within a predefined distance from the respective location.

4. A method according to claim 1 wherein determining weather-related information comprises weighting the at least one of the weather data or radar data that was retrieved from the data structure based upon a time associated with the at least one of the weather data or radar data.

5. A method according to claim 1 further comprising identifying weather data values or radar data values that are outliers and excluding weather data values or radar data values identified as outliers from a determination of the weather-related information.

6. A method according to claim 1 wherein determining weather-related information comprises identifying one or more tiles associated with hazardous driving conditions based upon the weather-related information, and wherein the method further comprises causing an indication of the one or more tiles associated with hazardous driving conditions to be provided.

7. A method according to claim 1 wherein causing the at least one of the weather data or the radar data to be stored in the tree structure comprises causing the weather data to be stored in a first R-tree and causing the radar data to be stored in a second R-tree.

8. A method according to claim 7 wherein retrieving the at least one of the weather data or the radar data comprises spatially querying at least one of the first R-tree or the second R-tree, respectively, based on a location of the respective tile.

9. A method according to claim 7 wherein retrieving the at least one of the weather data or the radar data comprises spatially querying at least one of the first R-tree or the second R-tree, respectively, based on a location of the respective tile in order to obtain the weather data or the radar data for tiles within a predefined distance of the respective tile.

10. A method according to claim 1 wherein in an instance where the at least one of the weather data or the radar data is utilized by a road navigational system the tiles associated with geographical regions that encompass only a body of water are not created by a tile service.

11. A method according to claim 1 wherein the size of the plurality of tiles is based upon the granularity of the weather-related information.

12. A method according to claim 1, wherein the respective location is one of a plurality of respective locations located along a route.

13. An apparatus comprising at least one processor and at least one memory comprising computer program code, the at least one memory and the computer program code configured to, with the at least one processor, cause the apparatus to:

receive at least one of weather data or radar data, wherein the weather data or radar data is captured by one or more remote weather stations or weather radar stations positioned at different locations;

cause the at least one of the weather data or radar data to be stored in a data structure, wherein causing the at least one of the weather data or radar data to be stored comprises causing the at least one of the weather data or radar data to be stored in a tree structure organized based on relative locations of a plurality of tiles, each tile of the plurality of tiles being associated with a respective geographical region;

receive input specifying a respective location and identify a respective tile of the plurality of tiles that includes the respective location;

for the respective tile, retrieve the at least one of the weather data or radar data from the data structure, wherein the respective tile is one of the plurality of tiles and includes the respective location;

retrieve at least one of additional weather data or additional radar data from the data structure for at least one additional tile of the plurality of tiles based at least in part on the tree structure, wherein the at least one additional tile is located at least partially within a predefined region corresponding to the respective location and the at least one additional tile is a different tile than the respective tile; and determine weather-related information for the respective tile based upon a weighted aggregation of both (a) the at least one of the weather data or radar data that was retrieved from the data structure for the respective tile that includes the respective location and (b) the at least one of the additional weather data or additional radar data that was retrieved from the data structure for the at least one additional tile, wherein a respective weight used to perform the weighted aggregation decreases with increasing distance between the respective location and a location of a source of the at least one of the weather data or radar data or the at least one of the additional weather data or additional radar data.

14. An apparatus according to claim 13 wherein the at least one memory and the computer program code are further configured to, with the at least one processor, cause the apparatus to define the plurality of tiles, each tile being associated with a different respective geographical region.

15. An apparatus according to claim 13 wherein the at least one memory and the computer program code are configured to, with the at least one processor, cause the apparatus to retrieve the at least one of the weather data or radar data from the data structure by querying the tree structure so as to retrieve the at least one of the weather data or radar data that is within a predefined distance from the respective location.

16. An apparatus according to claim 13 wherein the at least one memory and the computer program code are configured to, with the at least one processor, cause the apparatus to determine weather-related information by weighting the at least one of the weather data or radar data that was retrieved from the data structure based upon a time associated with the at least one of the weather data or radar data.

17. An apparatus according to claim 13 wherein the at least one memory and the computer program code are further configured to, with the at least one processor, cause the apparatus to identify weather data values or radar data values that are outliers and exclude weather data values or radar data values identified as outliers from a determination of the weather-related information.

18. An apparatus according to claim 13 wherein determining weather-related information comprises identifying one or more tiles associated with hazardous driving conditions based upon the weather-related information, and wherein the method further comprises causing an indication of the one or more tiles associated with hazardous driving conditions to be provided.

19. A computer program product comprising at least one non-transitory computer-readable storage medium having computer-executable program code portions stored therein, the computer-executable program code portions comprising program code instructions configured to:

receive at least one of weather data or radar data, wherein the weather data or radar data is captured by one or more remote weather stations or weather radar stations positioned at different locations;

cause the at least one of the weather data or radar data to be stored in a data structure, wherein causing the at least one of the weather data or radar data to be stored comprises causing the at least one of the weather data or radar data to be stored in a tree structure organized based on relative locations of a plurality of tiles, each tile of the plurality of tiles being associated with a respective geographical region;

receive input specifying a respective location and identify a respective tile of the plurality of tiles that includes the respective location;

for the respective tile, retrieve the at least one of the weather data or radar data from the data structure, wherein the respective tile is one of the plurality of tiles and includes the respective location;

retrieve at least one of additional weather data or additional radar data from the data structure for at least one additional tile of the plurality of tiles based at least in part on the tree structure, wherein the at least one additional tile is located at least partially within a predefined region corresponding to the respective location and the at least one additional tile is a different tile than the respective tile; and determine weather-related information for the respective tile based upon a weighted aggregation of both (a) the at least one of the weather data or radar data that was retrieved from the data structure for the respective tile that includes the respective location and (b) the at least one of the additional weather data or additional radar data that was retrieved from the data structure for the at least one additional tile, wherein a respective weight used to perform the weighted aggregation decreases with increasing distance between the respective location and a location of a source of the at least one of the weather data or radar data or the at least one of the additional weather data or additional radar data.

20. A computer program product according to claim 19 wherein the program code instructions configured to retrieve the at least one of the weather data or radar data from the data structure comprise program code instructions configured to query the tree structure so as to retrieve the at least one of the weather data or radar data that is within a predefined distance from the respective location.

21. A computer program product according to claim 19 wherein the program code instructions configured to determine weather-related information comprise program code instructions configured to weight the at least one of the weather data or radar data that was retrieved from the data structure based upon at least one of a distance from a respective location for which weather-related information is to be determined or a time associated with the at least one of the weather data or radar data.

* * * * *